United States Patent [19]

Hiketa

[11] Patent Number: 4,817,753
[45] Date of Patent: Apr. 4, 1989

[54] INTERAXLE DIFFERENTIAL RESTRICTION DEVICE FOR VEHICLE FOUR WHEEL DRIVE SYSTEMS

[75] Inventor: Manabu Hiketa, Hiroshima, Japan

[73] Assignee: Mazda Motor Corporation, Hiroshima, Japan

[21] Appl. No.: 91,029

[22] Filed: Aug. 31, 1987

[30] Foreign Application Priority Data

Sep. 2, 1986 [JP] Japan .................. 61-206117
Sep. 10, 1986 [JP] Japan .................. 61-213071

[51] Int. Cl.$^4$ .............................. B60K 17/35
[52] U.S. Cl. .................. 180/249; 74/710.5; 74/711
[58] Field of Search ........... 180/248, 249, 250, 297; 74/710.5, 714, 665 T, 711

[56] References Cited

U.S. PATENT DOCUMENTS

| | | | |
|---|---|---|---|
| 3,400,777 | 9/1968 | Hill | 74/714 |
| 3,492,890 | 2/1970 | Hill et al. | 180/249 |
| 4,428,452 | 1/1984 | Muraoka | 180/249 |
| 4,541,503 | 9/1985 | Akutagawa | 180/249 |
| 4,589,304 | 5/1986 | Ashikawa | 74/714 |
| 4,693,334 | 9/1987 | Hiraiwa | 180/249 |

FOREIGN PATENT DOCUMENTS 81226 4/1986 Japan .................. 180/248
1252753 11/1971 United Kingdom .

Primary Examiner—David M. Mitchell
Assistant Examiner—Everett G. Diederiks, Jr.
Attorney, Agent, or Firm—Fleit, Jacobson, Cohn & Price

[57] ABSTRACT

A vehicle four wheel drive system including an engine located in the front part of the vehicle body adjacent to the front wheel axles with the output shaft arranged to extend transversely of the vehicle body. A transmission is provided at a side of the engine and has an input shaft connected with the output shaft of the engine through a power clutch. On the front wheel axles, there is a front inter-wheel differential gear mechanism. At a side of the inter-wheel differential gear opposite to the engine, there is an inter-axle differential gear and a transfer gear is located at a side of the inter-axle differential gear opposite to the inter-wheel differential gear. There is further provided a differential restricting device which may be a differential lock device or a differential limiting device. The device is located at a side of the transfer gear opposite to the inter-axle differential gear.

17 Claims, 5 Drawing Sheets

INTERAXLE DIFFERENTIAL RESTRICTION DEVICE FOR VEHICLE FOUR WHEEL DRIVE SYSTEMS

CROSS-REFERENCE TO THE RELATED APPLICATIONS

The present application is related to the patent application Ser. No. 042,809 filed on Apr. 27, 1987 and entitled "FOUR WHEEL DRIVE VEHICLE".

BACKGROUND OF THE INVENTION

1. Field of the Invention

The present invention relates to a power transmission system for a four wheel drive motor vehicle having an inter-axle differential gear mechanism, and more particularly to a locking mechanism for the inter-axle differential gear mechanism of such four wheel drive motor vehicle 2. Description of the Prior Art The U.S. Pat. No. 4,541,503 issued on Sept. 17, 1985 to H. Akutagawa et al discloses a four wheel drive motor vehicle having an inter-axle differential gear mechanism in addition to inter-wheel differential gear mechanisms provided in respective ones of the front and rear wheel axles. In the motor vehicle disclosed by the U.S. patent, the engine is located in the front part of the vehicle with the output shaft extending in the transverse direction of the vehicle A transmission is provided at one axial end of the engine and connected with the output shaft of the engine to be driven thereby. The transmission has an output member connected with an input member of the inter-axle differential gear mechanism which has two output members, one being connected with the front wheel axle through a front inter-wheel differential gear mechanism and the other with the rear wheel axle through a transfer gear and a rear inter-wheel differential gear mechanism.

The arrangement disclosed by the U.S. patent provides a compact structure in that the inter-axle differential gear mechanism is located on the front wheel axle coaxially with the front inter-wheel differential gear mechanism. The inter-wheel differential gear mechanism is located at a side of the inter-axle differential gear mechanism adjacent to the engine and the transfer gear is located at the opposite side of the inter-wheel differential gear mechanism with respect to the inter-axle differential gear mechanism. Further, the inter-axle differential gear mechanism and the front inter-wheel differential gear mechanism are housed in the clutch housing in which the clutch is provided.

In the driving system disclosed by the U.S. patent, the inter-axle differential gear mechanism is provided with a differential lock mechanism for restricting the operation of the inter-axle differential gear mechanism. For the purpose, the input member of the inter-axle differential gear mechanism has a spline shaft portion which is formed with externally threaded spline teeth and the transfer gear which is connected with one of the output members of the inter-axle differential gear mechanism also has a spline shaft portion which is coaxial with the spline shaft portion on the input member and formed with externally threaded spline teeth aligned with the spline teeth on the spline portion on the input member. A sleeve member having internally threaded splines is provided on the spline shaft portions for axial slidable movement between an unlock position wherein the splines in the sleeve are disengaged from the splines on one of the spline shafts and a lock position wherein the splines in the spline shafts are engaged with the splines in the sleeve so that the input member of the inter-axle differential gear mechanism is directly connected with one output member.

The British patent No. 1,252,753 also discloses a motor vehicle four wheel drive system which has an inter-axle differential gear mechanism provided with a multiple disc type clutch device for controlling the differential action of the differential gear mechanism. The multiple disc type clutch device used in the British patent is considered as being advantageous in that the engagement and disengagement can be controlled quickly and precisely. This type of clutch can be readily used for automatic locking control of the inter-axle differential gear mechanism The U.S. Pat. No. 3,400,777 issued on Sept. 10, 1968 to C. Hill and the U.S. Pat. No. 3,492,890 issued on Feb. 3, 1970 to C. Hill et al also disclose four wheel drive motor vehicles having multiple disc type clutches for locking the inter-axle differential gear mechanisms.

In view of the advantages of the multiple disc type clutch to be used in the locking device for the inter-axle differential gear mechanism, the spline type locking device for the inter-axle differential gear mechanism in the U.S. patent to H. Akutagawa et al may be replaced by the multiple disc type clutch. It should however be noted that there will be inconveniencies in adopting the multiple disc type clutch in the arrangement of Akutagawa et al because this type of clutch is of a relatively large diameter so that it requires a larger diametrical space as compared with the spline type clutch used in the structure of Akutagawa et al.

In the driving arrangement by Akutagawa et al, a compact structure is obtained by locating the inter-axle differential gear mechanism and the front inter-wheel differential gear mechanism on the front wheel axle and housing in the clutch housing Further, the spline type clutch is provided at a side of the inter-wheel differential gear mechanism adjacent to the engine. It will therefore be understood that in this arrangement there will be no sufficient space for accommodating the multiple disc type clutch in the place of the spline type clutch The aforementioned U.S. patent to C. Hill teaches to locate the multiple disc type clutch between the planetary gear type inter-axle differential gear mechanism and a bevel gear which constitutes a transfer gear. The U.S patent to C. Hill et al also show a similar concept. This concept cannot be advantageously applied to the arrangement of Akutagawa et al because the transfer gear must be sidewardly displaced with respect to the inter-axle differential gear mechanism in order to provide a space for locating the clutch and the will be produced a dead space around the clutch making the driving arrangement bulky as a whole. It should further be noted that in case where the clutch is located between the inter-axle differential gear mechanism and the transfer gear, it will become difficult to access the clutch for maintenance and repair so that it will become necessary to disassemble the unit for having an access to the clutch.

The aforementioned British patent discloses a similar concept with respect to the location of the multiple disc type clutch for the locking device of the inter-axle differential gear mechanism. Therefore, the aforementioned problems cannot be solved by the teachings in the British patent.

SUMMARY OF THE INVENTION

It is therefore an object of the present invention to provide a driving system for four wheel drive vehicles in which the inter-axle and inter-wheel differential gear mechanisms are arranged in a compact manner and a locking device for the inter-axle differential gear mechanism is provided by a multiple disc type clutch.

Another object of the present invention is to provide a driving system for four wheel drive vehicles having an inter-axle differential gear mechanism which is provided with a differential locking device made of a multiple disc type arranged in a compact manner.

A further object of the present invention is to provide a vehicle four wheel drive system having an inter-axle differential gear mechanism arranged on a wheel axle coaxially with an inter-wheel differential gear mechanism and having a differential lock device close to the transfer gear without producing any dead space.

According to the present invention, the above and other objects can be accomplished by a vehicle four wheel drive system including engine means having output shaft means extending transversely of a vehicle body, transmission means having an input member and an output member extending transversely of the vehicle body and speed ratio changing means provided between the input and output members, said input member being connected with the output shaft means of the engine means, planetary type inter-axle differential gear means having an input member and two output members, said input member of the inter-axle differential gear means being connected with the output member of the transmission means, first inter-wheel differential gear means provided on first wheel axle means and connected with one of said two output members of the inter-axle differential gear means to drive said first axle means, second inter-wheel differential gear means provided on second wheel axle means, transfer gear means connected with the other of said two output members of the inter-axle differential gear means to drive said second inter-wheel differential gear mechanism, said inter-axle differential gear means and said transfer gear means being located on said first wheel axle means, said inter-wheel differential gear mechanism being located at a side of said inter-axle differential gear mechanism adjacent to said engine means, said transfer gear means being located at the side of the inter-axle differential gear mechanism opposite to the side where the inter-wheel differential gear mechanism is located, the improvement comprising differential restricting means provided coaxially with said inter-axle and inter-wheel differential gear means and located at a side of the transfer gear means opposite to said inter-wheel differential gear means, said differential restricting means including first clutch disc means connected with said transfer gear means and second clutch disc means opposite to said first clutch disc means and connected with said one output member of said inter-axle differential gear means, means for urging said first and second clutch disc means into power transmitting engagement with each other.

According to the arrangement of the present invention, the differential restricting means is located coaxially with the transfer gear means and the inter-axle and inter-wheel differential gear means. Further, the the differential restricting means is located at outermost position in the arrangement including the transfer gear means and the inter-axle and inter-wheel differential gear means. The position where the differential restricting means is provided is far from the engine means so that it is relatively easy to find a space for the restricting means.

The above and other objects and features of the present invention will become apparent from the following descriptions of preferred embodiments taking reference to the accompanying drawings.

DESCRIPTION OF THE PREFERRED EMBODIMENTS

Figure 1:
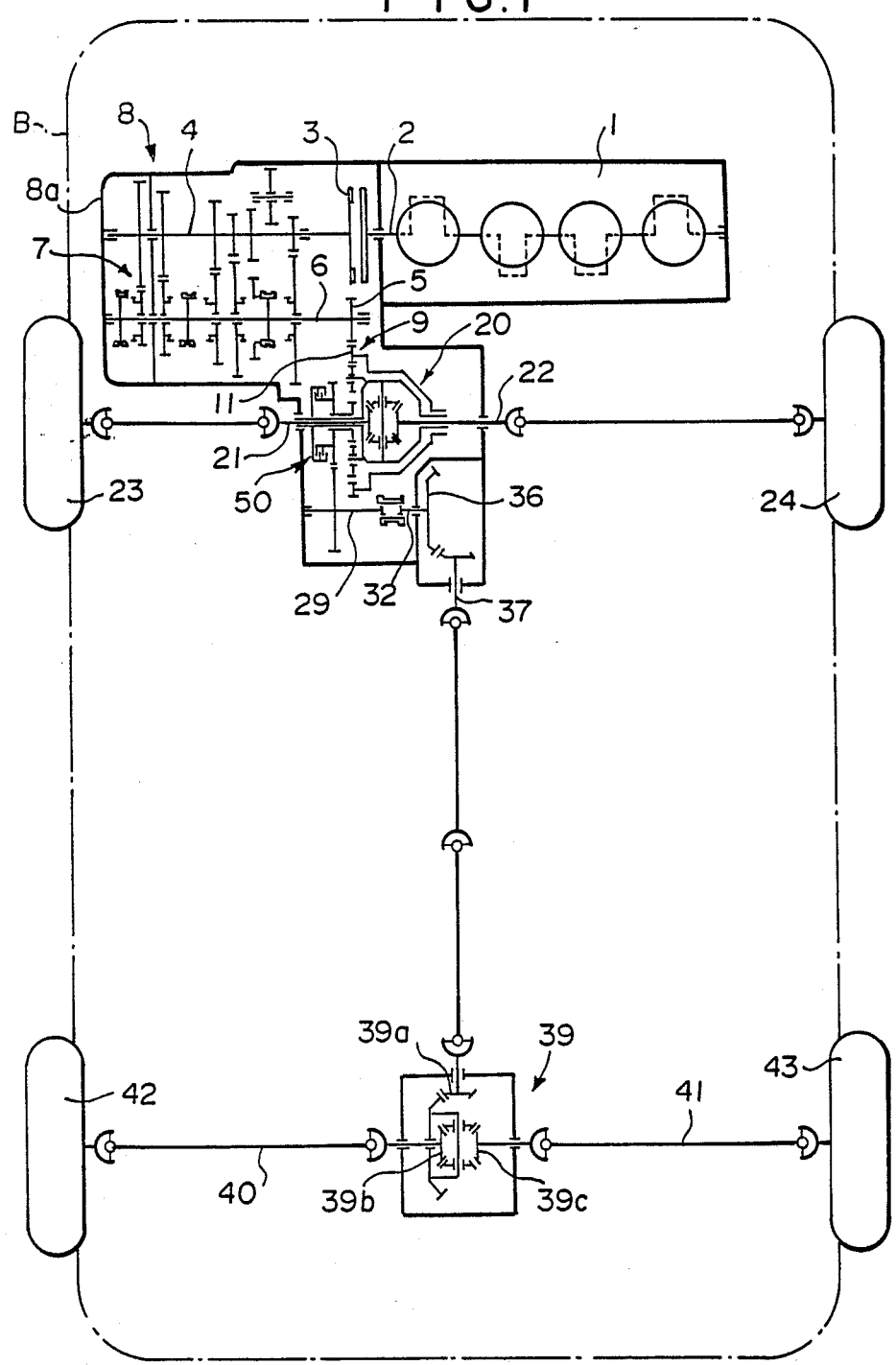
FIG. 1 is a diagrammatical plan view of a vehicle four wheel drive system in accordance with one embodiment of the present invention.

Referring to the drawings, particularly to FIG. 1, there is shown a vehicle four wheel drive system including an engine 1 which has an output shaft 2 extending transversely of a vehicle body B. Adjacent to one axial end of the engine 1, there is a transmission 8 which has an input shaft 4 and an output shaft 6 arranged to extend transversely of the vehicle body B. The input shaft 4 of the transmission 8 is connected through a power clutch 3 with the output shaft 2 of the engine 1. The output shaft 6 of the transmission 8 is provided at an end adjacent to the engine 1 with a drive gear 5. As conventional in the art, there is provided a speed changing gear mechanism 7 between the input shaft 4 and the output shaft 6. In this embodiment, the transmission 8 is of a manual type, however, it should be noted that the invention can be applied to a vehicle driving system having an automatic transmission.

Figure 2:
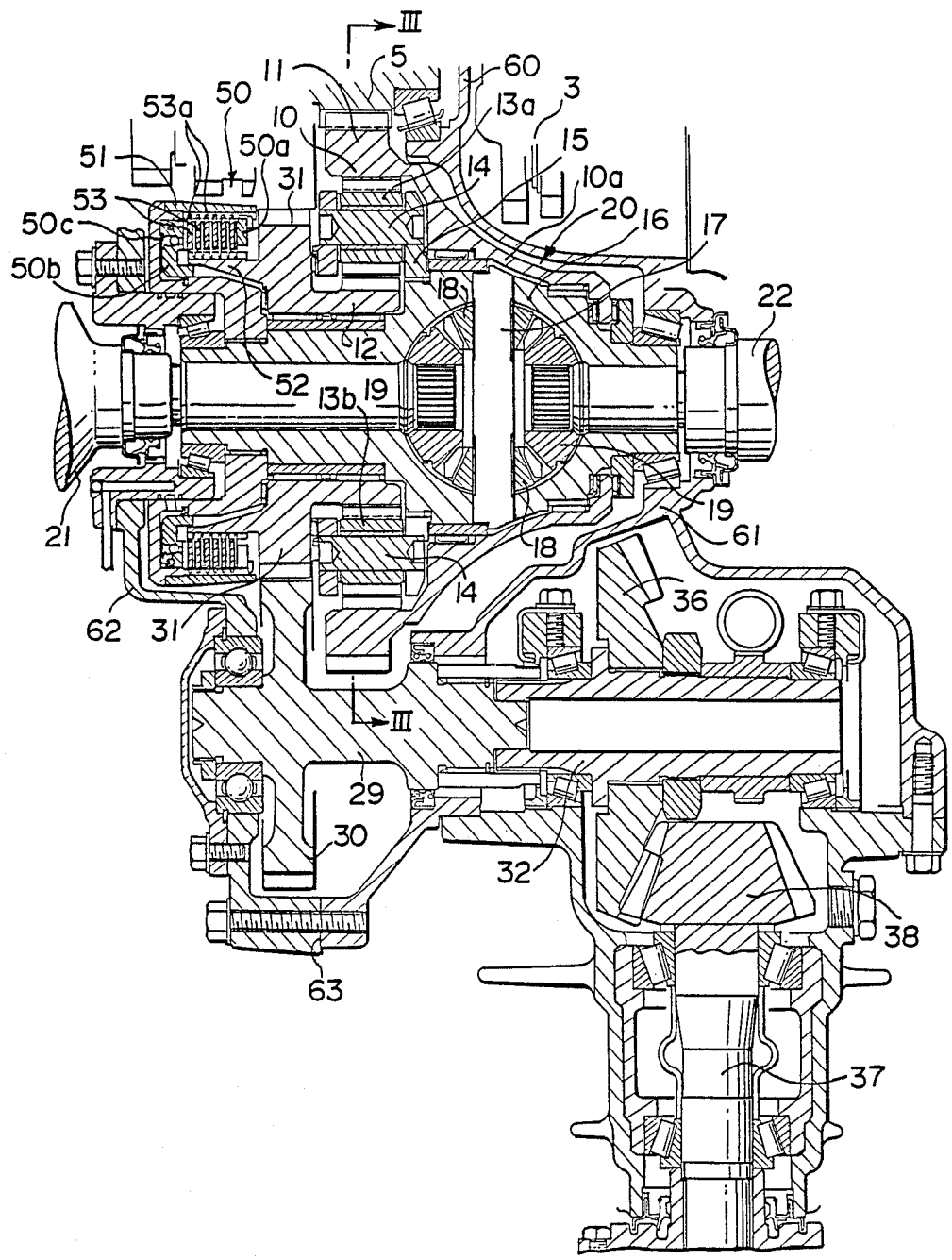
FIG. 2 is a sectional view showing the details of the arrangements around the front wheel axle.
Figure 3:
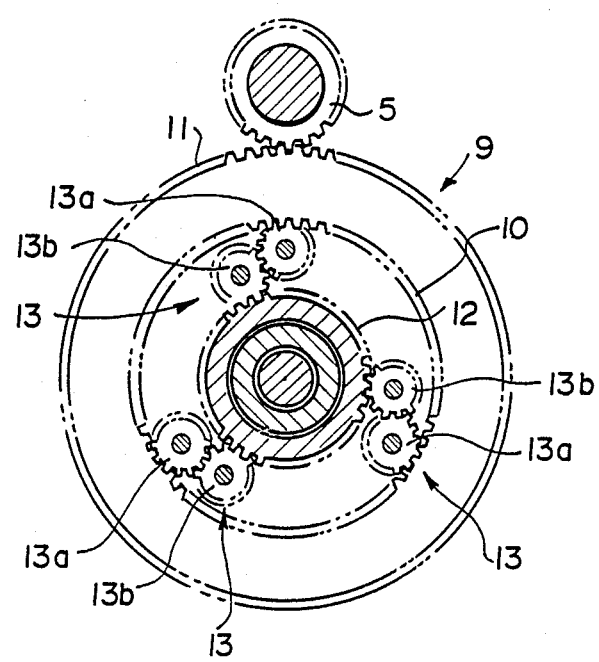
FIG. 3 is a sectional view taken along the line III—III in FIG. 2.

The vehicle has front wheels 23 and 24 and rear wheels 42 and 43. Between the front wheels 23 and 24, there is a front inter-wheel differential gear mechanism 20 which is connected through front wheel axles 21 and 22 with the front wheels 23 and 24. It will be noted in FIG. 1 that the engine 1 and the transmission 8 are located in the front portion of vehicle body B adjacent to the front axles 21 and 22. On the front axle 21, there is provided a planetary type inter-axle differential gear mechanism 9 having an input gear 11. The input gear 11 of the differential gear mechanism 9 is located at a side of the inter-wheel differential gear mechanism 20 opposite to the engine 1. Speaking in the opposite way, the front inter-wheel differential gear mechanism 20 is located at a side of the inter-axle differential gear mechanism 9 adjacent to the engine 1. The drive gear 5 on the output shaft 6 of the transmission 8 is engaged with the input gear 11 of the inter-axle differential gear mechanism 9. Referring to FIG. 2, it will be noted that the input gear 11 of the inter-axle differential gear mechanism 9 is formed integrally with a ring gear 10 of the differential gear mechanism 9. As shown in FIG. 3, the inter-axle differential gear mechanism 9 is provided with pinions 13a which are engaged on one hand with the ring gear 10 and on the other hand with pinions 13b. The pinion 13b are engaged with a sun gear 12 which is coaxial with the front axle 21. The pinions 13a and 13b provides a pinion gear set 13 and mounted through pinion shafts 14 on a common pinion carrier 15.

The front inter-wheel differential gear mechanism 20 includes a differential casing 16 which is supported rotatably by the front axles 21 and 22 and constitute an input member of the gear mechanism 20. In the differential casing 16, there are provided a pair of bevel gears 18 which are carried by a shaft 17 extending transversely with respect to the front axles 21 and 22 and secured at the opposite ends to the differential casing 16. The bevel gears 18 are engaged with bevel gears 19 which are respectively provided on the front axles 21 and 22 at the ends adjacent to the shaft 17. The bevel gears 19 constitutes output members of the inter-wheel differential gear mechanism 20.

The input gear 11 and the ring gear 10 of the inter-axle differential gear mechanism 9 is integrally formed with a bell-shaped housing 10a which is mounted on the differential casing 16 through appropriate bearings so that the housing 10a is rotatable on the differential casing 16. The differential casing 16 is formed with an axial extension which extends along the front axle 21. The sun gear 12 of the inter-axle differential gear mechanism 9 is supported for rotation by the extension of the differential casing 16 through appropriate bearings.

The pinion carrier 15 of the inter-axle differential gear mechanism 9 provides one of the output members of the mechanism 9 and is secured to the differential casing 16 to transmit the driving torque to the front inter-wheel differential gear mechanism 20. The sun gear 12 provides the other output member of the mechanism 9 and is formed integrally with a transfer gear 31 which is located at a side of the inter-axle differential gear mechanism 9 opposite to the inter-wheel differential gear mechanism 20.

Referring further to FIGS. 1 and 2, it will be noted that a counter-shaft 29 is provided and extends in parallel to the front axles 21 and 22. The counter shaft 29 is formed integrally with a gear 30 which is engaged with the transfer gear 31. The counter shaft 29 is connected with a second counter shaft 32 which is axially aligned with the shaft 29 and splined thereto. A bevel gear 36 is provided on the second counter shaft 32 to rotate with the shaft 32. The bevel gear 36 is engaged with a bevel gear 38 which is provided at the front end of a propeller shaft 37. The propeller shaft 37 is connected at the rear end with a rear differential gear mechanism 39 at an input member 39a thereof. The rear differential gear mechanism 39 has output members 39b and 39c which are respectively connected with rear axles 40 and 41 to transmit the driving torque to the rear wheels 42 and 43.

In order to restrict the function of the inter-axle differential gear mechanism 9, there is provided a friction disc type differential lock mechanism or a clutch 50. In accordance with the features of the present invention, the mechanism 50 is located at a side of the transfer gear 31 opposite to the inter-axle differential gear mechanism 9. The mechanism 50 comprises an outer cylinder housing 51 which is connected with the axial extension of the differential casing 16 of the front inter-wheel differential gear mechanism 20. In the outer cylinder 51, there is provided an inner hub 52 which is integrally formed with the sun gear 12 of the inter-axle differential gear mechanism 9. The hub 52 carries a plurality of clutch discs 53 which are mounted on the hub 52 for axial slidable movement. The outer cylinder carries on the inner surface of the outer wall a plurality of clutch discs 53a which are interlaced with the clutch discs 53 on the inner hub 52. The clutch discs 53a are mounted on the cylinder 51 for axial slidable movement. The cylinder 51 is provided at an axial end adjacent to the transfer gear 31 with a stopper 50a for limiting the axial movements of the clutch discs 53 and 53a. In the cylinder 51, there is provided a piston 50b which is located at an end opposite to the end where the stopper 50a is provided. Between the piston 50b and the end portion of the cylinder 51, there is defined a cylinder chamber 50c. Although not shown in the drawings, means is provided to introduce a hydraulic pressure to the cylinder chamber 50c to have the clutch engaged. When the hydraulic pressure is released from the chamber 50c, the clutch is disengaged. It will readily be understood that the inter-axle differential gear mechanism 9 is locked when the clutch 50 is engaged but the differential gear mechanism is permitted to function when the clutch is disengaged.

It will be noted in FIG. 2 that the power clutch 3 is housed in a clutch housing 60. The housing 60 is formed with an extension 61 which encloses the inter-wheel differential gear mechanism 20 and the inter-axle differential gear mechanism 9. The front wheel axle 22 is rotatably supported by the extension 61 of the clutch housing 60. The transmission 8 is also covered by a transmission housing 8a which is shown in FIG. 1. The transmission housing 8a has an extension 62 which covers the clutch 50 and the transfer gear 31. The extension 62 of the transmission housing 8a is connected with the extension 61 of the clutch housing 60 at a mating surface 63. It will be noted in FIG. 2 that the clutch 50 is positioned at a side of the mating surface 63 opposite to the inter-axle differential gear mechanism 9. It will be understood that the arrangement is advantageous in that an access to the clutch 50 can be obtained simply by removing the transmission housing 8a having the extension 62.

Figure 4:
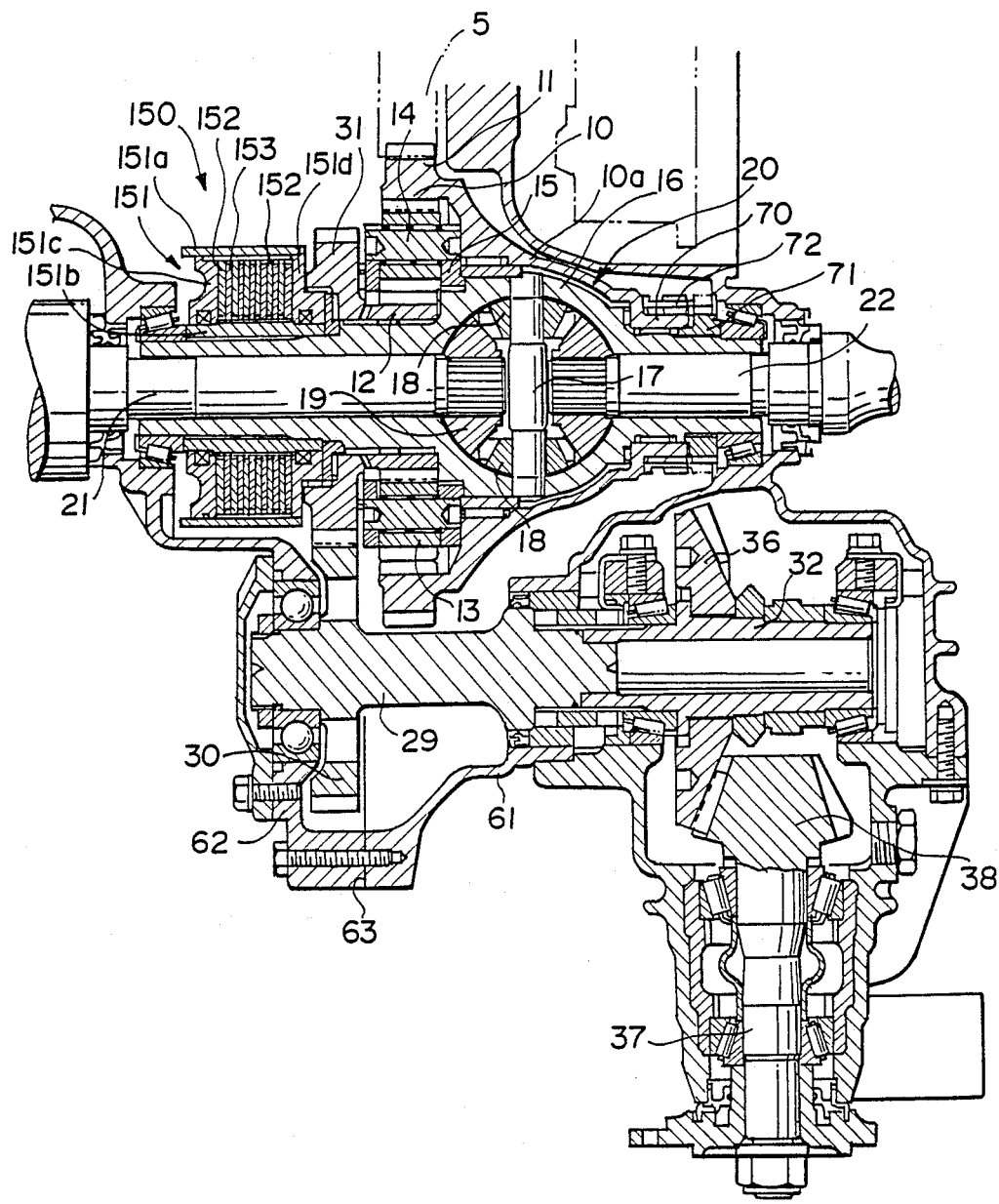
FIG. 4 is a sectional view similar to FIG. 2 but showing another embodiment of the present invention; and, FIG. 5 is a sectional view showing a further embodiment of the present invention.

Referring now to FIG. 4, there is shown another embodiment of the présent invention which is substantially identical with the embodiment shown in FIGS. 1 through 3 so that corresponding parts will be shown by the same reference numerals and detailed descriptions will not be repeated. In the embodiment which is being described, the clutch 50 for providing the differential lock mechanism is substituted by a viscous coupling 150. The viscous coupling 150 includes a casing 151 comprised of an outer tube 151a, an inner tube 151b and a pair of end plates 151c and 151d. The outer tube 151a is secured to the end plates 151c and 151d and the end plate 151d is in turn secured to the sun gear 12 and the transfer gear 31 by means of splines. Thus, the outer tube 151a rotates with the sun gear 12 and the transfer gear 31 as a unit. The inner tube 151b is secured to the axial extension of the differential casing 16 of the front inter-wheel differential gear mechanism 20. The assembly of the outer tube 151a and the end plates 151c and 151d is rotatably with respect to the inner tube 151b and appropriate seals are provided between the end plates 151c and 151d and the inner tube 151b to define a sealed chamber in the casing 151. The outer tube 151a carries a plurality of discs 152 to rotate therewith. The inner tube 151b carries a plurality of discs 153 which are interlaced with the discs 152 carried by the outer tube 151a. The casing is filled with viscous fluid such as silicon oil. The viscous coupling thus functions to prevent the speed difference between the differential casing 16 and the transfer gear 31 from being increased beyond a predetermined value.

In this embodiment, it will further be noted that the bell shaped housing 10a integral with the input gear 11 and the ring gear 10 of the inter-axle differential gear mechanism 9 is formed with a cylindrical extension 70 extending in the direction toward the engine along the front axle 22 and formed with external spline teeth. The differential casing 16 is formed with an extension extending along the front axle 22 through the extension 70 on the housing 10a. The extension of the differential casing 16 is attached with a spline ring 71 which is axially aligned with the extension 70 on the housing 10a and formed with external spline teeth which are aligned with the spline teeth on the extension 70. A sleeve 72 is provided to slide on the extension 70 and the spline ring 71 and has internal spline teeth which are adapted to be engaged with the spline teeth on the extension 70 and the spline ring 71. The sleeve 72 is movable between a disengaged position wherein the spline teeth on the sleeve 72 are disengaged from the spline teeth on the spline ring 71 and an engaged position wherein the spline teeth on the sleeve 72 are engaged with the spline teeth on both the extension 70 and the spline ring 71. In the engaged position of the sleeve 72, the inter-axle differential gear mechanism 9 is locked and prevented from performing a differential function.

Figure 5:
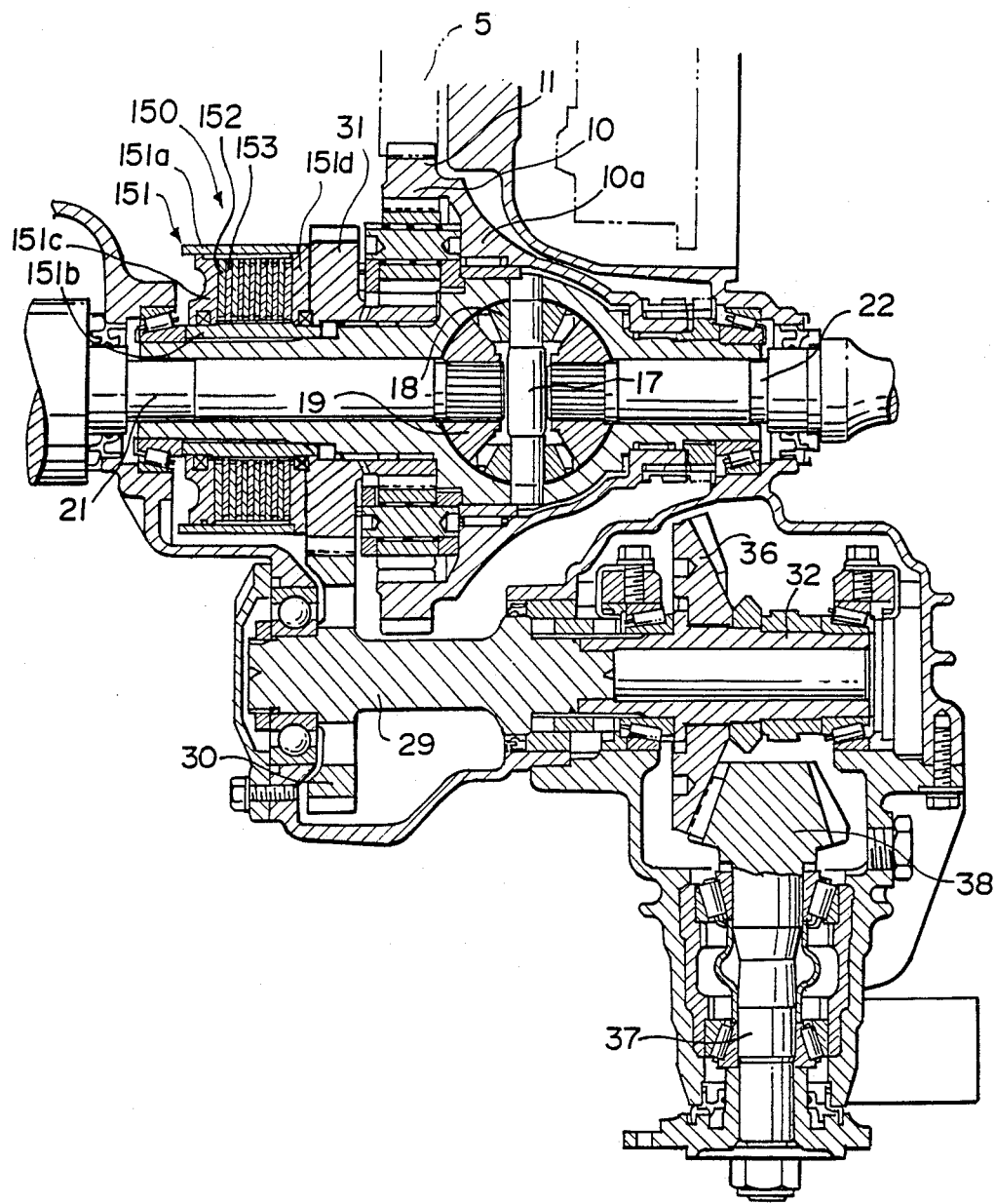

FIG. 5 shows another embodiment of the present invention which is substantially identical with the embodiment shown in FIG. 4. Therefore, corresponding parts will be shown in FIG. 5 by the same reference numerals as in FIG. 4 and detailed descriptions will not be made. The embodiment shown in FIG. 5 is different from the embodiment shown in FIG. 4 in that the end plate 151d secured to the outer tube 151a of the casing 151 in the viscous coupling 150 is welded to the transfer gear 31. In other respect the arrangements are the same as those in FIG. 4.

The invention has thus been shown and described with reference to specific embodiments, however, it should be noted that the invention is in no way limited to the details of the illustrated arrangements but changes and modifications may be made without departing from the scope of the appended claims.

I claim:

1. A vehicle four wheel drive system including engine means having output shaft means extending transversely of a vehicle body, transmission means having an input member and an output member extending transversely of the vehicle body and speed ratio changing means provided between the input and output members, said transmission means being disposed adjacent to said engine means in the transverse direction of the vehicle body, said input member being connected with the output shaft means of the engine means, planetary type inter-axle differential gear means having an input member and two output members, said input member of the inter-axle differential gear means being connected with the output member of the transmission means, first inter-wheel differential gear means provided on first wheel axis means and connected with one of said two output members of the inter-axle differential gear means to drive said first wheel axle means, second inter-wheel differential gear means provided on second wheel axle means, transfer gear means connected with the other of said two output members of the inter-axle differential gear means to drive said second inter-wheel differential gear means, said inter-axle differential gear means and said transfer gear means being located on said first wheel axle means, said first inter-wheel differential gear means being located at one side of said inter-axle differential gear means adjacent to said engine means in the transverse direction of the vehicle body, said transfer gear means being located at the other side of the inter-axle differential gear means opposite to said one side where the first inter-wheel differential gear means is located, differential restricting means provided coaxially with said inter-axle differential gear means and the first inter-wheel differential gear means and located at a side of the transfer gear means opposite to said first inter-wheel differential gear means in the transverse direction of the vehicle body, said differential restricting means including first clutch disc means connected with said transfer gear means and second clutch disc means opposite to said first clutch disc means and connected with said one output member of said inter-axle differential gear means, and means for urging said first and second clutch disc means into power transmitting engagement with each other.

2. A vehicle four wheel drive system in accordance with claim 1 in which said differential restricting means includes friction clutch means having first disc means rotatable with said transfer gear means, second disc means rotatable with said one output member of the inter-axle differential gear means and piston means for urging said first and second disc means into frictional engagement.

3. A vehicle four wheel drive system in accordance with claim 2 in which said friction clutch means includes outer cylinder means connected with said one output member of the inter-axle differential gear means, inner hub means located in said cylinder means and connected with said transfer gear means, said first disc means being carried by said inner hub means, said second disc means being carried by said cylinder means, said piston means being provided in said cylinder means.

4. A vehicle four wheel drive system in accordance with claim 1 in which said differential restricting means includes casing means comprising inner tube means carrying said first disc means and outer tube means carrying said second disc means, said casing being filled with viscous fluid so that driving torque is transmitted through the viscous fluid between the first and second disc means.

5. A vehicle four wheel drive system in accordance with claim 4 in which said first inter-wheel differential gear means includes an input member connected with said one output member of the inter-axle differential gear means, said input member of the said first inter-wheel differential gear means having an axial extension on which said transfer gear means is mounted, said inner tube means being connected with said axial extension of the input member of the first inter-wheel differential gear means, said outer tube means being connected with said transfer gear means through spline means.

6. A vehicle four wheel drive system in accordance with claim 4 in which said inter-axle differential gear means is provided on said input member and one of said output members with axially aligned spline means, axially slidable sleeve means being provided for releasably connecting said spline means on said input member and said one output member of the inter-axle differential gear means to provide further differential lock means, said differential lock means being located at a side of the first inter-wheel differential gear means opposite to the inter-axle differential gear means.

7. A vehicle four wheel drive system in accordance with claim 1 in which said input member of the transmission means is connected with the output member of the engine means through power transmitting means housed in first housing means, said first inter-wheel differential gear means, said inter-axle differential gear means and said transfer gear means being housed in an extension of said first housing means in which said power transmitting means is located, said first housing means being connected with transmission housing means for covering said transmission means at a mating surface, said differential restricting means being covered by an extension of said transmission housing means, said differential restricting means being located at a position offset from said mating surface to a direction opposite to the engine means.

8. A vehicle four wheel drive system in accordance with claim 1 in which said input member of the transmission means is connected with the output member of the engine means through power transmitting means housed in housing means, said first inter-wheel differential gear means, said inter-axle differential gear means and said transfer gear means being housed in an extension of said housing means in which said power transmitting means is located.

9. A vehicle four wheel drive system in accordance with claim 1 wherein the output member of the transmission means if provided at an end of the transmission means adjacent to the engine means.

10. A vehicle four wheel drive system in accordance with claim 9 wherein the output member is a drive gear mounted on the output shaft of the transmission means and meshes with the input member of the inter-axle differential gear means.

11. A vehicle four wheel drive system in accordance with claim 1 wherein the inter-axle differential gear means includes a ring gear as the input member to which power is transmitted from the output member of the transmission means and a carrier and sun gear serve as the two output members.

12. A vehicle four wheel drive system in accordance with claim 11 wherein said carrier is adapted to transmit power to the first inter-wheel differential gear means and said sun gear is adapted to transmit power to the second inter-wheel differential gear means through the transfer gear means.

13. A vehicle four wheel drive system in accordance with claim 1 wherein the input of the inter-axle differential gear means is a member formed integrally with a ring gear of a planetary gear mechanism constituting said inter-axle differential gear means.

14. A vehicle four wheel drive system in accordance with claim 13 wherein the input and the ring gear of said inter-axle differential gear means are formed integrally as a bell-shaped housing.

15. A vehicle four wheel drive system in accordance with claim 14 wherein said bell-shaped housing is assembled in such a manner that the diameter of the housing is reduced toward the engine means with regard to the transverse direction of the vehicle body.

16. A vehicle four wheel drive system in accordance with claim 1 further including power clutch means for controlling power transmitted from the engine means to the transmission means, clutch housing means receiving said power clutch means, extension housing means formed on the clutch housing means for enclosing the inter-wheel differential means and the inter-axle differential gear means with the first wheel axle means being rotatably supported by the extension housing means of the clutch housing means.

17. A vehicle four wheel drive system in accordance with claim 16 wherein the clutch housing means is extended toward the engine means in the transverse direction of the vehicle body.

* * * * *